F. H. PARDON.
FISH HOOK.
APPLICATION FILED FEB. 7, 1910.
991,800.
Patented May 9, 1911.
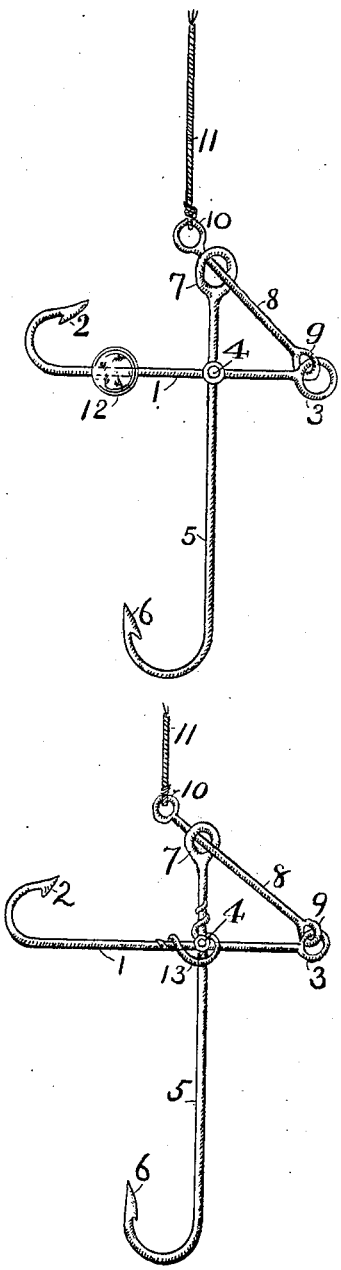

UNITED STATES PATENT OFFICE.

FRANK H. PARDON, OF OWENSBORO, KENTUCKY.

FISH-HOOK.

991,800.

Specification of Letters Patent.

Patented May 9, 1911.

Application filed February 7, 1910. Serial No. 542,612.

*To all whom it may concern:*

Be it known that I, FRANK H. PARDON, a citizen of the United States, residing at Owensboro, in the county of Daviess and State of Kentucky, have invented new and useful Improvements in Fish-Hooks, of which the following is a specification.

This invention relates to a new and useful invention in fish hooks, and more especially to double fish hooks or two fish hooks combined.

The object of this invention is to produce a combination fish hook; that is, a bait hook and gaff hook so arranged in construction that should the fish in taking the bait hook not become impaled thereon, the gaff hook will come into action and it will be impaled on the gaff hook.

The invention consists in the construction hereinafter set forth.

In the accompanying drawing, Figure 1 represents a hook provided with the invention and having a float for keeping the two hooks extended. Fig. 2 represents a hook provided with the invention and having a spring to keep the two hooks extended.

In these drawings, the numeral 1 represents a bait hook provided with the barb 2 at one end, and the loop or eye 3 at the other end. This bait hook is pivoted at 4 to a gaff hook 5 having the barb 6 at one end, and the eye or loop 7 at the other end. As shown, these two hooks are pivoted together at the pivot 4 so that the barb 6 of the gaff hook is below the barb 2 of the bait hook. A bar 8 is connected at one end 9 to the loop 3 of the bait hook 1, and passing through the loop 7 of the gaff hook 5 is a loop or eye 10, to which is secured the lower end of the fishing cord 11. As shown in Fig. 1, there is placed upon the bait hook on the side away from the loop or eye 10 toward the barb 2 a float 12. As shown in Fig. 2, a coiled spring 13 is secured to the two hooks at their pivotal connection 4, the spring being arranged in such a position as to normally keep the two hooks apart, as shown in said Fig. 2. In the two forms shown in these figures, the spring or float, which are equivalents, keep the hooks separated from each other in the manner shown in these two figures. Should a fish take the hook, or should he only nibble at the bait and make a pull, the action would be such as to cause the gaff hook to rise, catching the fish on the under side. The bar 8 passing from the end of the bait hook through the end of the gaff hook, such bar being rigid, causes a direct pull between the two hooks and exerts a leverage on the gaff hook, quickly causing the barb 6 to rise and impale the fish.

Having described the invention, what I claim is,

1. The combination of a bait hook and gaff hook with a device which yieldably holds the two hooks apart, the two hooks being provided with an eye and a rod secured to the eye of the bait hook and passing through the eye of the gaff hook.

2. The combination of a bait hook and gaff hook with a spring which normally holds the two hooks apart or permits them to be held together, the two hooks being provided with an eye and a rod secured to the eye of the bait hook and passing through the eye of the gaff hook.

In testimony whereof I have hereunto set my hand in presence of two subscribing witnesses.

FRANK H. PARDON.

Witnesses:
T. M. MURPHY, Jr.,
C. E. McGILL.

Copies of this patent may be obtained for five cents each, by addressing the "Commissioner of Patents, Washington, D. C."